UNITED STATES PATENT OFFICE.

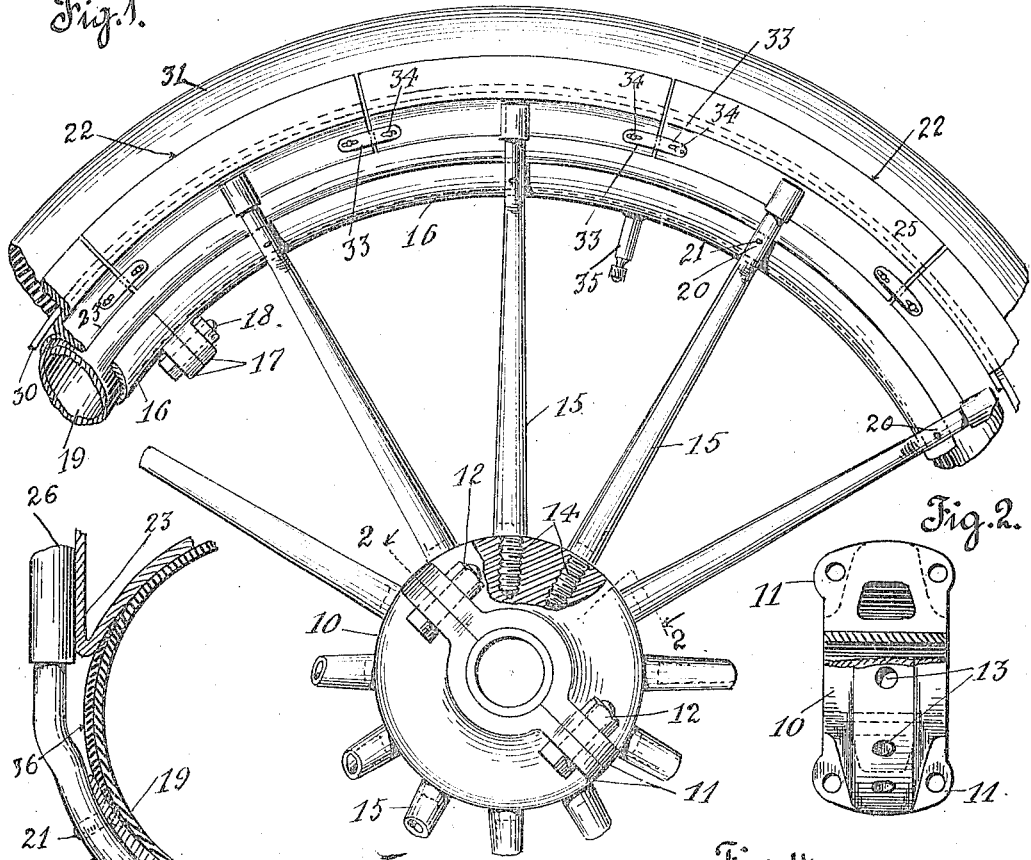

MATTHEW C. SHARPNACK, OF PRESCOTT, ARIZONA, ASSIGNOR OF ONE-HALF TO BEN F. GOODWIN, OF PRESCOTT, ARIZONA.

VEHICLE-WHEEL CONSTRUCTION.

1,198,071.  Specification of Letters Patent.  Patented Sept. 12, 1916.

Application filed July 25, 1914. Serial No. 853,188.

*To all whom it may concern:*

Be it known that I, MATTHEW C. SHARP-NACK, a citizen of the United States, residing at Prescott, in the county of Yavapai, State of Arizona, have invented new and useful Improvements in Vehicle-Wheel Constructions, of which the following is a specification.

This invention relates to a vehicle wheel.
It is the object of this invention to provide a vehicle wheel having a resiliently mounted rim whereby the shocks delivered to the tread portion of the wheel will be absorbed and not transmitted to the wheel spokes, and which construction obviates the use of pneumatic tires and the objectionable features thereof.

Another object is to provide a pneumatic support for the wheel rim adapted to be arranged between the wheel rim and the wheel spokes and extending continuously throughout the inner circumference of the rim so as to cushion the latter at all points throughout its periphery.
Another object is to provide a resiliently mounted wheel rim of the above character which can be readily assembled and taken apart, and in which the several parts are of simple design and readily manufactured.
Another object is to provide an effective means for securing the resiliently mounted wheel rim to the spokes which will permit of free radial movement of the wheel rim in relation to the spokes, but will prevent creeping of the wheel rim circumferentially of the wheel.

A further object is to provide a wheel in which the various parts can be separated and renewed when occasion requires so that when any one part becomes excessively worn it may be readily replaced.

The invention is illustrated in the accompanying drawings, in which:

Figure 1 is a view in side elevation of the upper portion of a wheel constructed in accordance with this invention, with parts broken away. Fig. 2 is a detail section and elevation of the wheel hub as seen on the line 2—2 of Fig. 1 in the direction indicated by the arrows. Fig. 3 is a detail cross section on the line 3—3 of Fig. 1, partly in elevation. Fig. 4 is a detail side elevation of a portion of the wheel rim as viewed at right angles to Fig. 3. Fig. 5 is an enlarged detail view illustrating the manner of seating the wheel rim and its pneumatic support on the wheel spokes.

More specifically, 10 indicates the wheel hub which is preferably formed of cast metal in two parts divided diametrically of the hub and formed with abutting flanges 11 adapted to be joined together by bolts 12. The periphery of the hub 10 is formed with a series of radially extending threaded bores 13 for the reception of threaded studs 14 formed on the inner ends of tubular metallic spokes 15.

The outer ends of the spokes 15 are bifurcated or forked to form a seat for and extend on opposite sides of a rim member 16 which is formed in semi-circular sections, the ends of which are provided with flanges 17 adapted to be connected together by means of a bolt 18. The rim 16 is segmental in cross section to form a seat for an annular pneumatic tube 19, and the members 20 of the spokes 15 are curved to conform to the underside of the rim 16 to which members the rim is rigidly secured by means of screws 21 or other suitable fastenings. The outer ends of the members 20 are extended in parallel relation to each other and are cylindrical in form.

Slidably and pivotally mounted on the outer ends of the spokes 15 are metallic segments 22 which are formed with arched transverse section to conform to the outer periphery of the tube 19; the sides of the segments 22 extending in parallel relation to each other forming walls 23, the outer arcuate edges of which are bent outwardly to form shoulders 24 which terminate in flanges 25.

Mounted on the walls 23 of the segments intermediate their ends are tubes 26 which are pivotally connected to the outer faces of the walls 23 by means of studs 27 extending through the walls 23 and having nuts 28 on their inner ends by which the tubes 26 are held in place. These tubes 26 are designed to receive parallel ends of the members 20 which are slidable within the tubes thus forming a pivotal and slidable connection between the segments 22 and the spokes 15. The shoulders 24 are formed with apertures 29 opposite the upper ends of the tubes 26 so that the shoulders 24 will not form a stop to limit the movement of the segments 22 in relation to the ends of the spokes 15. Supported on the shoulders 24 is a series of segmental plates 30 which form a seat for the annular tread portions 31 of the wheel which may be formed of any suitable material, but preferably consists of the ordinary cushion tire. The segments 22 are of such length that when arranged in position on the spokes 15 the ends of the adjacent segments will be spaced a short distance apart to permit of relative radial movement of the segments inwardly on the spokes 15 and the adjacent segments 22 are connected together by means of links 33 secured to the outer faces of the walls 23 by removable pivot pins 34; the links 33 serving to hold the segments in place when the tube 19 is deflated so as to prevent their falling from the spokes when the tire 31 is removed.

In assembling the wheel the spokes 15 are screwed on the hub sections 10 and the rim sections 16 are secured to the spokes by means of the screws 21 whereupon the hub sections 10 and rim sections 16 are secured together by means of their respective bolts 12 and 18. The pneumatic tube 19 is then placed in position on the rim 16 in a deflated condition with the valve stem 35 thereof extending through an aperture in the rim 16 as shown in Fig. 1. The segments 22 are then placed in position on the outer ends of the spokes 15 with the tubes 25 slidably engaging the forked ends thereof as particularly shown in Fig. 3. The segmental plates 30 are then placed in position on the shoulders 24 and the cushion tire 31 is disposed in the annular channel formed by the plates 30 and the side flanges 25 of the segments 22. The tube 19 is then inflated, thereby forming an annular pneumatic cushion extending throughout the periphery of the rim 16 and interposed between the rim and the tire carrying segments 22. When thus arranged the inner edges of the segments 22 will be spaced from the outer edges of the rim 16 so as to permit of inward radial movement of the tire carrying segments 22 and the rim on the pneumatic cushion formed by the tube 19.

As a means for protecting and strengthening the exposed side portions of the tube 19 extending between the segments 22 and the rim 16 and also to prevent the entrance of dirt and grit between the tube and the segments and the rim annular shield members 36 formed of fabric or other suitable flexible material are interposed between the outer walls of the tube 19 and the inner curved faces of the segments 22 and the rim 16 as particularly shown in Figs. 3 and 5; the inflation of the tube 19 serving to bind the edges of the member 36 against the segments and the rim to retain the members 36 in place.

In operation of the invention, a shock or pressure on the tread portion of the tire 31 will act to depress the segments 22 in relation to the rim 16 in opposition to the pneumatic pressure in the tube 19; the segments moving inwardly on the spokes 15 by reason of the slidable connection between the forked ends of the spokes and the tubes 26. When the point of pressure on the tire is intermediate the ends of the spokes a limited rocking movement of the segments 22 in relation to each other is permitted by reason of the pivotal mounting of the tubes 26 on the segments; the links 34 serving to prevent excess rocking movement of the segments in relation to each other and also serving to distribute the strains throughout the periphery of the wheel.

What I claim is:

A wheel, comprising a hub, spokes thereon having bifurcated outer ends, a rim supported on said spokes, a second rim comprising segments, one supported on each of the spokes in reciprocal and pivotal relation thereto, the connections between said segments and spokes comprising tubes pivoted on said segments slidably engaging the forked ends of the spokes, a pneumatic tube interposed between the rim and the segments, and a tire mounted on said segments.

In witness that I claim the foregoing I have hereunto subscribed my name this 16th day of July, 1914.

MATTHEW C. SHARPNACK.

Witnesses:
MARGUERITE BATES,
MARIE BATTEY.